Jan. 5, 1932.  C. B. HUSTON  1,839,922
MOTOR CONTROL SYSTEM
Original Filed May 24, 1928
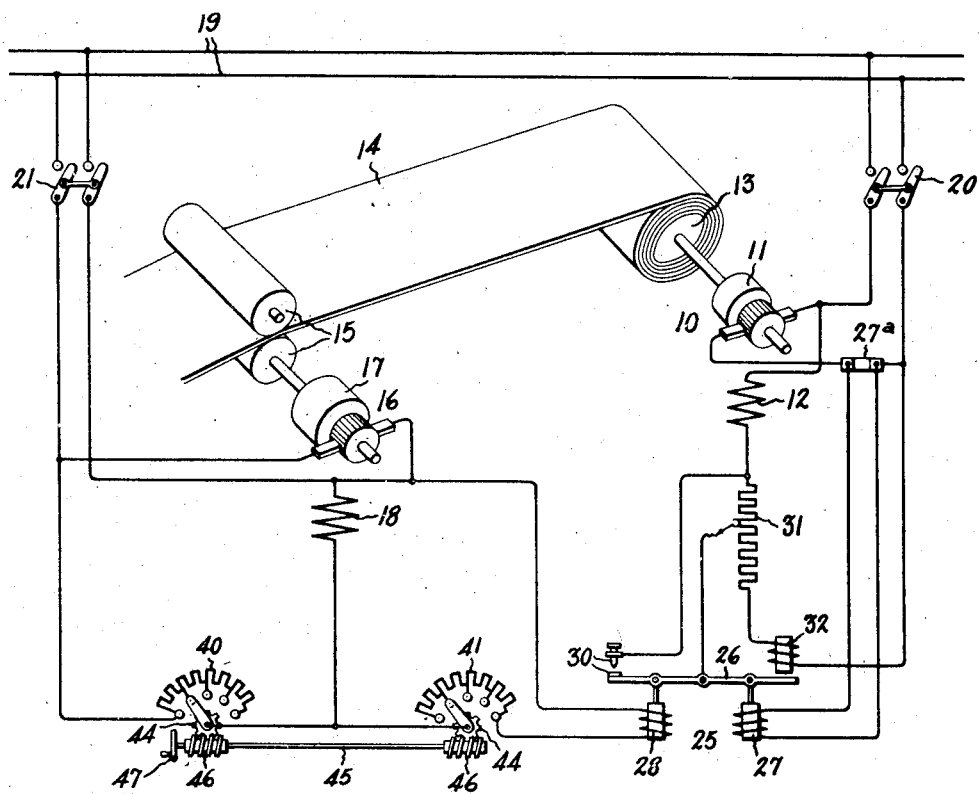
Inventor:
Claude B Huston,
by Charles V. Tullar
His Attorney.

Patented Jan. 5, 1932

1,839,922

UNITED STATES PATENT OFFICE

CLAUDE B. HUSTON, OF SCHENECTADY, NEW YORK, ASSIGNOR TO GENERAL ELECTRIC COMPANY, A CORPORATION OF NEW YORK

MOTOR CONTROL SYSTEM

Application filed May 24, 1928, Serial No. 280,320. Renewed May 15, 1931.

My invention relates to electric motor control systems, more particularly to control systems for electric motors employed to drive reels for winding up strip materials, such as cold rolled strip steel, and has for its object the provision of a control system for the driving motor which is of simple construction and which is convenient and efficient in operation.

In the manufacture of various sheet materials such as cold rolled strip steel, the finished product is wound on reels. In winding the material on the reel it is desirable to maintain constant tension in the material regardless of the speed at which it is being delivered to the reel. My invention, therefore, contemplates the provision of control means for the reel driving motor whereby regardless of the speed of mill operation, a predetermined substantially constant pull will be exerted upon the material being wound.

In carrying my invention into effect in one form thereof, I provide the reel driving motor with a control system which includes means for regulating the motor so that it will maintain a substantially constant tension in the strip as it is being wound, and further provide means for adjusting the setting of the regulating means concurrently with changes in the feed of the strip to the reel so that the reel motor will operate to maintain the substantially constant tension in the material regardless of the speed of mill operation.

For a more complete understanding of my invention reference should be had to the accompanying drawing in which the single figure is a diagrammatic representation of a system of control embodying my invention.

Referring to the drawing, I have shown my invention in one form as applied to a direct current motor employed to drive the collecting reel of a cold rolled strip steel mill. As shown, a direct current motor 10, provided with an armature 11 and a field winding 12, is directly connected to drive a reel 13 which serves to collect and wind the strip material 14 passing from the last stand of the main finishing rolls 15. An electric motor 16, preferably of the adjustable speed direct current type, is provided for driving the main finishing rolls 15. As shown, the direct current motor 16 is provided with an armature 17 and a field winding 18. A suitable source of direct current supply 19, preferably of substantially constant voltage, is provided for both the motors 10 and 16, both of the motor armatures and field windings being supplied by the source 19. A switch 20 is inserted in the circuit leading from the source 19 to the motor 10, and likewise a switch 21 is inserted in the circuit leading from the source 19 to the motor 16.

It will be understood that in the manufacture of cold rolled strip steel and similar materials, it is desirable to maintain a certain substantially constant tension in the material between the last stand finishing rolls and the winding reel. It will be further understood that as long as the lineal speed of the strip remains constant, the power input to the reel motor must be constant in order to maintain a constant tension in the strip. Therefore, in order to maintain a constant tension in the strip under all conditions, the power input to the reel motor must increase or decrease proportionately as the speed of the last stand rolls increases or decreases, and further the speed of the reel motor must decrease and its torque increase as the effective diameter of the reel increases when the strip is wound on. It will be evident since the voltage of the supply source 19 is substantially constant, that the current input to the reel motor 10 must vary directly with variations in the speed of the main motor 16 in order that the power input to the motor 10 may vary accordingly; and further for any given constant speed of the motor 16 the current input to the motor 10 must be maintained constant, which may be effected by varying the field of the motor. Furthermore, as the effective diameter of the reel 13 increases the field of the motor 10 must be increased in order to maintain a constant current input to the motor, whereby the torque of the motor is increased so as to maintain the predetermined tension in the strip.

In order that the current input to the reel motor 10 may be so regulated that a predetermined constant tension will be maintained in the strip 14, suitable control means are provided for the motor. The control means comprises a regulator 25, which as shown, comprises a bar 26 pivoted at a point adjacent its center, a coil 27 having its core connected to the bar 26 at a point adjacent one end thereof, and a coil 28 having its core connected to the bar 26 at a point adjacent its other end. The coil 27 is connected across a shunt 27a in the circuit of the armature 11 of the reel motor so that the current in the coil and consequently the pull it will exert on its core are proportional to the current drawn by the motor 10 from the source 19. The coil 28 may be energized from any suitable source; as shown, it is connected across the field 18 of the motor 16.

The regulator 25 is provided with contacts 30 connected across an adjustable resistance 31 which is in turn connected in the circuit of the reel motor field winding 12 so that when the contacts are open the resistance will be inserted in the field circuit and when the contacts are closed the resistance will be short circuited. It will be observed therefore, that the strength of the field 12 and consequently the current intake of the motor 10 will depend upon the relative values of the currents that energize the coils 27 and 28. The regulator is so adjusted that when the current in the reel motor armature is less than a predetermined value to be maintained to give the desired tension in the strip, the pull of the coil 27 will be overbalanced by that of the coil 28 and the contacts 30 will be held in their open position, thus inserting the resistance 31 in the circuit of the field 12. The field will then be weakened which will cause more current to flow through the armature 11. It will be understood that since the reel motor speed is fixed by the speed at which the strip is fed to the reel, the speed of the reel motor will remain constant notwithstanding its field variations so long as the strip speed remains constant. When the current in the armature 11 increases to a value above the predetermined current to be maintained, the pull exerted by the coil 27 will increase to such a degree that the coil 28 will be overpowered and the contacts 30 will be closed to short circuit the resistance 31 whereby the strength of the field 12 will be increased. As a result, the motor 10 will draw less current from the line until when the armature current is less than the predetermined value the coil 27 will be overpowered by the coil 28 and the contacts 30 will be opened to re-insert the resistance in the field circuit. The motor current will now increase and the cycle of operation will be repeated as previously described. The regulator 25 will thus be given a vibratory motion, alternately short circuiting and inserting the resistance 31 in the field circuit of the motor 10. As the contacts rapidly vibrate, the effective resistance in the field circuit will depend upon the proportion of time that the contacts are in their open position, and assuming that the motor 16 runs at a constant speed, the vibrator 25 will maintain a constant current input to the motor 10 whereby the motor will apply a constant tension to the strip 14.

An anti-hunting coil 32 is provided for assisting the coils 27 and 28 to effect the vibratory motion. This coil 32 has its core operably associated with the bar 26 so that the coil will act in opposition to the coil 27, and as shown, its core is so positioned that it will operate upon the same end of the bar as the core of the coil 27. As shown, the coil 32 is connected in series in the circuit of the field 12 so that as soon as the contacts 30 are closed the momentary increase in the field current will cause the pull exerted by the coil 32 to increase, whereby the coil 28 with the assistance of the coil 32 will immediately open the contacts 30.

Even though the motor 16 runs at a constant speed, the speed of the reel motor 10 must gradually decrease since the effective diameter of the reel 13 gradually increases due to the winding of the strip 14. As the reel diameter increases the reel speed obviously decreases and as a result the motor will tend to apply a torque of such increased value that unless suitably compensated for there would result an increase in the tension in the strip. This action of the motor however causes its armature current to increase whereby the regulator operates to close the contacts 30 and strengthen the motor field until the armature current has been reduced to the predetermined value. Thus, since the reel is constantly increasing in diameter, and the armature current always tending to increase, the proportion of time that the contacts 30 remain closed will gradually increase. As a result of this action in maintaining the armature current constant, the effective field resistance will be gradually reduced and the motor field current thereby reduced with the result that the motor torque is increased so as to maintain a constant tension in the strip 14.

In order that the main motor 16, which derives the finishing rolls 13 may be operated at various desired speeds, a suitable rheostat 40 is connected in series with the motor field winding 18. It will be understood that by varying the effective resistance in the circuit of the field winding 18, the speed of the motor 16 and consequently the speed of the strip 14 will be varied accordingly. The current input to the motor 10 must vary proportionately with the changes in speed of the motor 16 and therefore the current setting of the regulator 25 must be adjusted accordingly, so that when the speed of the motor 16 is increased to a certain value, the setting will be such that a current of increased value will be maintained in the armature of the motor 10 whereby the motor will maintain the desired tension in the strip, and when the speed of the motor 16 is decreased to a certain value the setting will be such that a constant current of decreased value will be maintained in the armature of the motor 10 so that the motor will still maintain the desired tension in the strip.

As shown, a suitable rheostat 41 is connected in series with the coil 28 and is mechanically connected to the rheostat 40 so that its effective resistance will be varied inversely as the effective resistance of the rheostat 40 is varied, and simultaneously therewith. This mechanical connection is effected by providing each of the movable elements of the rheostats 40 and 41 with a gear member 44. A suitable shaft 45 is arranged to operate between the rheostats, the shaft being provided with worm gears 46 which mesh with the gears 44 so that when the shaft is turned, motion will be imparted to each of the movable elements of the rheostats 40 and 41 whereby the effective resistance of the rheostats will be varied, the effective resistance of the rheostat 41 being increased when the effective resistance of the rheostat 40 is decreased, and vice versa. The shaft is provided with a suitable hand wheel 47 whereby it may be conveniently operated.

It will be understood that when the main motor field circuit is increased to its maximum strength, the main motor will operate at its minimum speed, and it will be further understood that when the main motor is operated at its minimum speed the motor 10 will also operate at its minimum speed. Consequently a current input to the reel motor 10 must be established so that the motor will maintain the desired tension in the strip. Thus, the regulator 25 must be so adjusted that when the field 18 is at its maximum strength the current flowing through the coil 28 will be at its minimum value. This adjustment of the regulator 25 is effected by means of the rheostat 41. It will be observed that when the resistance of the rheostat 40 is entirely short circuited so that the motor 16 will be caused to run at its minimum speed, the entire resistance of the rheostat 41 will be inserted in series with the coil 28 so that minimum current will flow through the coil and the regulator 25 will be set so that the lower limit of current input to the motor 10 will be established. As the resistance of the rheostat 40 is inserted in the circuit of the field winding 18 so as to cause the speed of the motor 16 to increase, the resistance of the rheostat 41 will be concurrently cut out of the circuit of the coil 28 so that the current input to the motor 10 will be increased accordingly. Thus, when the speed of the main motor 16 is increased the pull of the coil 28 will increase proportionately to the increase in speed. To balance the increased pull of the coil 28, the pull of the coil 27 must increase, which means that the current and consequently the horsepower input to the motor 10 must increase accordingly. This will be accomplished by the regulator 25, which will hold the contacts 30 open for a greater proportion of time, thereby increasing the effective resistance in the field circuit of the reel motor so that its current input will increase proportionately with the increase in the speed of the main motor 16. Should the speed of the motor 16 and consequently that of the last stand rolls be decreased by adjustment of the rheostat 40, the pull exerted by the coil 28 will be decreased and the current and consequently the horse-power input to the motor 10 will be proportionately decreased. Thus as the speed of the main motor 16 is changed, the voltage applied to the coil 28 is changed so that the regulator will be set to maintain a current of different value in the armature of the motor 10 so as to maintain the predetermined tension in the strip.

Obviously the coil 28 may be energized directly from the source 19. Results will be obtained, as previously described, simply by suitably proportioning the rheostat 41 so as to properly change the energization of the coil 28 as the rheostat 40 is adjusted to change the speed of the motor 16.

It will be understood that the resistance of the rheostat 41 will be proportioned to give the desired current input to the motor 10. For instance, the resistance of the rheostat 41 is preferably so proportioned that for given changes of field current on the main motor producing, for example, a 2:1 speed change on the main rolls, simultaneous changes in the inverse ratio will be made in the excitation of the coil 28, that is, at the maximum speed of the main motor which may be twice its minimum speed, the rheostat 41 will be so adjusted that the current through the coil 28 will be twice the value of the current which flows through the coil at the minimum speed of the main motor. As a result the regulator will hold twice the value of current on the reel motor when the main motor is running at its maximum speed.

In operation, it will be understood that the main motor 16 drives the main rolls 15 at any desired constant speed and that the motor 10 operates to maintain a certain predetermined tension in the strip 14, the current input to the motor 10 being suitably controlled by the regulator 25. The regulator 25 further controls the current input to the motor 10 by gradually decreasing its speed as the effective diameter of the reel gradually increases, whereby the torque delivered by the motor 10 will gradually increase. When the motor 16 is adjusted to run at higher or lower speeds, the regulator 25 will automatically adjust the effective resistance in the field circuit of the motor 10 so that the current input to the motor 10 will be increased or decreased accordingly, whereby regardless of the speed of the mill the desired predetermined tension will be constantly maintained in the strip 14.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States is:

1. The combination with a winding reel for a strip of material to be wound thereon, of a motor for delivering said material to of a motor for driving said reel, means for controlling said reel motor to maintain a tension in said strip, means for adjusting said control means, means for adjusting the speed of said delivery motor, and a single means for operating both of said adjusting means.

2. The combination with a winding reel for a strip of material to be wound thereon, of a motor for delivering said material to said reel, an electric motor for driving said reel, means responsive to the current input to said reel motor for controlling said reel motor to maintain a tension in said strip, means for adjusting said control means, means for adjusting the speed of said delivery motor, and a single means for operating said adjusting means.

3. The combination with a winding reel for a strip of material to be wound thereon, of an electric motor for delivering said material to said reel, a rheostat in the field winding of said motor whereby the strength of said field may be adjusted to vary the speed of said motor, a second electric motor for operating said winding reel, a regulator for said second motor electrically responsive to the armature current of said second motor, and means for changing the setting of said regulator concurrently with adjustments of said rheostate whereby the current input to said second motor is varied proportionately with the speed of said first motor.

4. The combination with a winding reel for a strip of material to be wound thereon, of a motor for delivering said material to said reel, means for adjusting the speed of said driving motor, an electric motor for operating said winding reel, means for controlling said reel motor to maintain a tension in said strip comprising a pair of operating coils, one of said operating coils being responsive to the current input to said reel motor, a rheostat inserted in the circuit of the other of said operating coils whereby its energization may be varied, and means for changing the effective resistance of said rheostat concurrently with changes in the speed of said delivery motor.

5. The combination with a winding reel for a strip of material to be wound thereon, of an electric motor for operating said reel, means for changing the feed of said strip to said reel, a resistance adapted to be inserted in the circuit of the field winding of said motor, and vibratory controlling means for said resistance whereby said resistance is periodically inserted in the field circuit of said motor so as to regulate said motor to maintain a tension in said strip, said vibratory controlling means comprising a pair of opposed operating coils, one of said coils being responsive to the current input to said reel operating motor, a rheostat inserted in the circuit of the other of said coils, and means for adjusting said rheostat simultaneously with changes in the feed of said strip to said reel.

6. The combination with a winding reel for a strip of material to be wound thereon, of an electric motor for delivering said material to said reel, means for changing the speed of said delivery motor, a second motor for operating said winding reel, a resistance adapted to be inserted in the field circuit of said second motor, means for regulating the insertion of said resistance whereby the strength of the field of said second motor is varied to vary the current input thereto directly with the speed of said first motor, said regulating means comprising a pair of electrical contacts shunted across said resistance, said contacts when opened inserting said resistance in the field circuit of said second motor and when closed by-passing said resistance, an operating coil responsive to the armature current of said second motor for closing said contacts, an operating coil opposed to said first operating coil for opening said contacts, a rheostat inserted in the circuit of said second operating coil, and means for changing the effective resistance of said rheostat as the speed of said first motor is changed.

7. The combination with a winding reel for a strip of material to be wound thereon, of an electric motor for delivering said material to said reel, a rheostat inserted in the field winding of said motor whereby the strength of said field may be adjusted to vary the speed of said motor, a second motor for operating said winding reel, a resistance adapted to be inserted in the field circuit of said second motor, and vibratory control means for said resistance whereby said resistance is periodically inserted in the field circuit of said second motor, said vibratory control means comprising a pair of opposed operating coils, one of said coils being shunted in the armature circuit of said second motor and the other being shunted across the field winding of said first motor, a rheostat connected in the circuit of said second operating coil operably connected to said first rheostat whereby when said first rheostat is adjusted to change the speed of said first motor said second rheostat will be adjusted to change the excitation of said second coil so as to cause the current input to said second motor to vary proportionately with the speed of said first motor.

In witness whereof, I have hereunto set my hand this 23rd day of May, 1928.

CLAUDE B. HUSTON.